United States Patent
Matsui et al.

(10) Patent No.: US 11,899,237 B2
(45) Date of Patent: Feb. 13, 2024

(54) MULTICORE OPTICAL FIBER, METHOD OF DESIGNING MULTICORE OPTICAL FIBER, AND OPTICAL TRANSMISSION METHOD

(71) Applicant: Nippon Telegraph and Telephone Corporation, Tokyo (JP)

(72) Inventors: Takashi Matsui, Musashino (JP); Kazuhide Nakajima, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 392 days.

(21) Appl. No.: 17/294,892

(22) PCT Filed: Nov. 8, 2019

(86) PCT No.: PCT/JP2019/043826
§ 371 (c)(1),
(2) Date: May 18, 2021

(87) PCT Pub. No.: WO2020/105470
PCT Pub. Date: May 28, 2020

(65) Prior Publication Data
US 2022/0003920 A1 Jan. 6, 2022

(30) Foreign Application Priority Data
Nov. 21, 2018 (JP) .................. 2018-218153

(51) Int. Cl.
*G02B 6/02* (2006.01)
*G02B 27/00* (2006.01)

(52) U.S. Cl.
CPC ..... *G02B 6/02042* (2013.01); *G02B 27/0012* (2013.01)

(58) Field of Classification Search
CPC ................................. G02B 6/02042
See application file for complete search history.

(56) References Cited

U.S. PATENT DOCUMENTS 7,079,736 B2 * 7/2006 Takahashi ............. C03C 25/607
398/81
7,844,155 B2 * 11/2010 Bickham ............ G02B 6/02333
385/144
(Continued)

FOREIGN PATENT DOCUMENTS

JP 2018021999 2/2018
JP 6560806 B1 * 8/2019 ......... G02B 27/0012

OTHER PUBLICATIONS

Gonda et al., "125 μm 5-core fibre with heterogeneous design suitable for migration from singlecore system to multi-core system" ECOC, 42nd European Conference and Exhibition on Optical Communications, Dusseldorf, Sep. 18-22, 2016, pp. 547-549.
(Continued)

*Primary Examiner* — Charlie Y Peng
(74) *Attorney, Agent, or Firm* — Fish & Richardson P.C.

(57) ABSTRACT

It is an object of the present invention to provide a multicore optical fiber, a design method for the multicore optical fiber and an optical transmission method using the multicore optical fiber including four cores having a standard cladding diameter of 125±1 μm for an existing single mode optical fiber covering several thousands of kilometers of transmission. The multicore optical fiber according to the present invention disposes two-stage claddings with different refractive indices around each core, and designates as a predetermined range, a core radius a1, a radius a2 of a first cladding region surrounding each core, specific refractive index Δ1 relative to the core of the first cladding region and a specific refractive index Δ2 relative to the core of a second cladding region including four cores and the first cladding region.

9 Claims, 14 Drawing Sheets

(56) References Cited

U.S. PATENT DOCUMENTS

| | | | |
|---|---|---|---|
| 9,081,129 B2 * | 7/2015 | Matsuo | G02B 6/02042 |
| 11,366,266 B2 * | 6/2022 | Sagae | H04B 10/80 |
| 2008/0279515 A1 * | 11/2008 | Bickham | G02B 6/02357 |
| | | | 385/123 |
| 2020/0379168 A1 * | 12/2020 | Mukasa | G02B 6/4246 |

OTHER PUBLICATIONS

Hayashi et al., "Design and fabrication of ultra-low crosstalk and low-loss multi-core fiber," Opt. Express, Aug. 2011, 19(17):16576-16592.

Matsui et al., "118.5 Tbit/s Transmission over 316 km-Long Multi-Core Fiber with Standard Cladding Diameter," OECC, Aug. 2017, 2 pages.

Matsui et al., "Design of 125 µm cladding multi-core fiber with full-band compatibility to conventional single-mode fiber," ECOC, Sep. 2015, 3 pages.

Takahashi et al., "First Demonstration of MC-EDFA-Repeatered SDM Transmission of 40×128-Gbit/s PDM-QPSK Signals per Core over 6, 160-km 7-core MCF," ECOC Postdeadline Papers, Th3C3, Sep. 2012, 3 pages.

Tamura et al., "Aeff Expanded Non-Binding 2-Core Fiber Having Cladding Diameter of 125 µm," IEICE (The Institute of Electronics, Information and Communication Engineers) Society Conference, B-10-2, Sep. 2016, p. 193, 4 pages (with English Translation).

Winzer et al., "Penalties from In-Band Crosstalk for Advanced Optical Modulation Formats," ECOC Technical Digest, Sep. 2011, 3 pages.

\* cited by examiner

|  |  | DESIGN EXAMPLE (1) | DESIGN EXAMPLE (2) |
|---|---|---|---|
| $a_1$ |  | 5.83μm | 6.57μm |
| $a_2/a_1$ |  | 2.5 | 2.5 |
| $\Delta_1$ |  | -0.68% | -0.61% |
| $\Delta_2$ |  | -0.38% | -0.31% |
| $A_{eff}$ | λ = 1550nm | 85μm² | 102μm² |
| $α_b$ | λ = 1625nm, R=30mm | <0.1dB/100turn | <0.1dB/100turn |
| $λ_c$ |  | 1530nm | 1530nm |

| | MEASUREMENT CONDITION | DESIGN EXAMPLE (1) |
|---|---|---|
| $a_1$ | | 6μm |
| $a_2/a_1$ | | 3 |
| $\Delta_1$ | | -0.6% |
| $\Delta_2$ | | -0.4% |
| EFFECTIVE CROSS-SECTIONAL AREA $A_{eff}$ | λ = 1550nm | 83~89 μm² |
| BENDING LOSS $\alpha_b$ | λ = 1625nm, R=30mm | <0.01 dB/100turn |
| CUTOFF WAVELENGTH $\lambda_c$ | | <1490 nm |
| TRANSMISSION LOSS | λ = 1550nm | <0.18 dB/km |
| | λ = 1625nm | <0.25 dB/km |
| XT | λ = 1625nm | <-66 dB/km | ized Application No. PCT/JP2019/043826, having an International Filing Date of Nov. 8, 2019, which claims priority to Japanese Application Serial No. 2018-218153, filed on Nov. 21, 2018. -->

MULTICORE OPTICAL FIBER, METHOD OF DESIGNING MULTICORE OPTICAL FIBER, AND OPTICAL TRANSMISSION METHOD

CROSS-REFERENCE TO RELATED APPLICATIONS

This application is a National Stage application under 35 U.S.C. § 371 of International Application No. PCT/JP2019/043826, having an International Filing Date of Nov. 8, 2019, which claims priority to Japanese Application Serial No. 2018-218153, filed on Nov. 21, 2018. The disclosure of the prior application is considered part of the disclosure of this application, and is incorporated in its entirety into this application.

TECHNICAL FIELD

The present disclosure relates to a multicore optical fiber having a plurality of cores, a design method for the multicore optical fiber and an optical transmission method using the multicore optical fiber.

BACKGROUND ART

Multicore optical fibers having a plurality of core regions (MCF) are being actively studied in anticipation of drastic increase in transmission capacity using space division multiplexing technology. It is also known that power consumption can be reduced particularly in optical transmission paths using space division multiplexing, and MCF is expected to be used in long-distance optical communication systems including submarine communication systems; Non-Patent Literature 1 describes a case where a 10000 km class transmission experiment using MCF has been successfully conducted. Here, it is necessary to prevent deterioration of transmission characteristics in MCF due to inter-core crosstalk (XT). To reduce XT, not only a design of core parameters in MCF but also inter-core distances to be set appropriately are required, and Non-Patent Literature 2 reports on an MCF with an extremely low XT where inter-core XT is set to −30 dB or less in 10000 km.

Here, in order to set a sufficiently wide core interval to reduce XT, the MCF presented in many reports including Non-Patent Literatures 1 and 2 has a cladding diameter of 150 to 230 µm, larger than conventional optical fibers. However, since the length of an optical fiber manufactured from one optical fiber preform decreases in inverse proportion to the square of the cladding diameter, increasing the cladding diameter significantly degrades productivity of the optical fiber. Existing optical fiber parts or the like are designed in accordance with the conventional cladding diameter of 125 µm, and so peripheral parts need to be re-designed to utilize the MCF of the increased cladding diameter, requiring a lot of research and development for practical use.

Thus, MCF having a cladding diameter of 125 µm, which is equivalent to the conventional one, has been under development in recent years. Adopting a standard cladding diameter of 125 µm makes it possible to maintain mass productivity of optical fibers at the same level as the conventional level or higher, and utilize standard connection parts and existing peripheral articles such as optical cables. Furthermore, since each MCF core has optical characteristics equivalent to existing optical fiber, compatibility with existing optical interfaces can be secured, it is possible to easily upgrade existing equipment to MCF.

Non-Patent Literatures 3 and 4 report on an MCF having XT of −30 dB or less in 100 km and including four cores with optical characteristics equivalent to existing single mode optical fiber (SMF). Non-Patent Literature 3 shows that four cores can be disposed when the same kind of core structure is used and Non-Patent Literature 5 shows that five cores can be disposed using a plurality of core structures. Non-Patent Literature 6 shows that MCF having characteristics equivalent to submarine low loss optical fibers is under study and two cores can be disposed at a cladding diameter of 125 µm.

CITATION LIST

Non-Patent Literature

Non-Patent Literature 1: H. Takahashi et al., "First Demonstration of MC-EDFA-Repeatered SDM Transmission of 40×128-Gbit/s PDM-QPSK Signals per Core over 6,160-km 7-core MCF," ECOC2012, Th3C3, September 2012.

Non-Patent Literature 2: T. Hayashi et al., "Design and fabrication of ultra-low crosstalk and low-loss multi-core fiber," Opt. Express, vol. 19, pp. 16576-16592, August 2011.

Non-Patent Literature 3: T. Matsui et al., "Design of multi-core fiber in 125 µm cladding diameter with full compliance to conventional SMF," ECOC2015, We.1.4.5, September 2015.

Non-Patent Literature 4: T. Matsui et al., "118.5 Tbit/s Transmission over 316 km-Long Multi-Core Fiber with Standard Cladding Diameter" OECC2017, PDP2, August 2017.

Non-Patent Literature 5: T. Gonda et al., "125 µm 5-core fibre with heterogeneous design suitable for migration from single-core system to multi-core system" ECOC2016, W2B1, September 2016.

Non-Patent Literature 6: Tamura et al., "Aeff Expanded Non-Binding 2-Core Fiber Having Cladding Diameter of 125 µm" IEICE (The Institute of Electronics, Information and Communication Engineers) Society Conference, B-10-2, September 2016

Non-Patent Literature 7: P. J. Winzer et al., "Penalties from In-Band Crosstalk for Advanced Optical Modulation Formats," ECOC2011, Tu5B7, September 2011.

SUMMARY OF THE INVENTION

Technical Problem

However, in consideration of MCF with four cores while maintaining an existing cladding diameter of 125 µm, there has been a problem of the limit being approximately several hundreds of kilometers due to the XT constraint as described in Non-Patent Literatures 3 to 5. As described in Non-Patent Literature 6, in order to realize an XT with which transmission of several thousands of kilometers can be supported, the number of cores is limited to two for a cladding diameter of 125 µm and it is difficult to dispose three or more cores.

In order to solve the above problems, an object of the present invention is to provide a multicore optical fiber with four cores having a standard cladding diameter of 125±1 µm for an existing single mode optical fiber and covering several thousands of kilometers of transmission, a design method for the multicore optical fiber and an optical transmission method using the multicore optical fiber.

Means for Solving the Problem

In order to attain the above described object, a multicore optical fiber according to the present invention disposes two-stage claddings with different refractive indices disposed around each core, and designates a core radius a1, a radius a2 of a first cladding region surrounding each core, specific refractive index Δ1 with respect to the core of the first cladding region and a specific refractive index Δ2 with respect to the core of a second cladding region including four cores and the first cladding regions as a predetermined range.

More specifically, the multicore optical fiber according to the present invention includes:

four cores having a radius a1 disposed in a longitudinal direction in square lattice shape;

a first cladding region disposed around the core and having a radius a2 with a refractive index lower than the refractive index of the core, a specific relative refractive index difference between the cladding region and the core being $\Delta_1$; and a second cladding region disposed on an outer periphery of the first cladding region and having a refractive index higher than the refractive index of the first cladding region and lower than the refractive index of the core, a specific relative refractive index difference between the cladding region and the core being $\Delta_2$, in which an outer diameter of the second cladding region is 125±1 μm, an effective cross-sectional area at a wavelength of 1550 nm is 80 μm² or more, bending loss at a wavelength of 1625 nm and a bending radius of 30 mm is 0.1 dB/100 turns or less, and a cutoff wavelength is 1530 nm or less.

The presence of the first cladding region helps confine an electric field distribution to the core, making it possible to narrow a core interval with XT reduced and provide a multicore optical fiber having a cladding diameter of 125 μm with the four cores disposed, thus enabling long-distance transmission.

The multicore optical fiber according to the present invention may include a region having a width w and having the same refractive index as the refractive index of the second cladding region between the core and the first cladding region. In this case, the width w is preferably 0 μm<w≤1.3 μm.

The parameters of the multicore optical fiber according to the present invention are as follows:

The relationship between the Δ1 and the total value XT (dB/km) of inter-core crosstalk per km is characterized by satisfying Formula C1.

[Formula C1]

$$\Delta_1 \leq 4.93 \times 10^{-5} XT - 0.00127 \quad (C1)$$

The relationship between the a1 and the Δ1 is characterized by satisfying Formula C2.

[Formula C2]

$$a_1 \geq -28041\Delta_1^2 - 560.65\Delta_1 + 3.1369 \quad (C2)$$

The relationship between the Δ2 and the total value XT (dB/km) of inter-core crosstalk per km is characterized by satisfying Formula C3.

[Formula C3]

$$\Delta_2 \geq -1.14 \times 10^{-5} XT - 0.00509 \quad (C3)$$

It is characterized that a ratio $a_2/a_1$ between the $a_1$ and the $a_2$ is 1.0 or more and 3.0 or less, the relationship between the $\Delta_1$, the $a_2/a_1$, and the effective cross-sectional area $A_{eff}$ at a wavelength of 1550 nm satisfies Formula C4, and the relationship between the $\Delta_2$, the $a_2/a_1$, and the $A_{eff}$ satisfies Formula C5.

[Formula C4]

$$\Delta_1 \leq (1.9 \times 10^{-6} A_{eff}^2 - 0.00033 A_{eff} + 0.0163) a_2/a_1 + (-8.0 \times 10^{-6} A_{eff}^2 + 0.00139 A_{eff} - 0.0705) \quad (C4)$$

[Formula C5]

$$\Delta_2 \geq (5.0 \times 10^{-8} A_{eff}^2 - 6.5 \times 10^{-6} A_{eff} - 0.00108) a_2/a_1 + (-2.9 \times 10^{-7} A_{eff}^2 + 5.58 \times 10^{-5} A_{eff} - 0.00594)$$

and $$\Delta_2 \leq (5.0 \times 10^{-7} A_{eff}^2 - 9.5 \times 10^{-5} A_{eff} + 0.0056) a_2/a_1 + (-1.6 \times 10^{-6} A_{eff}^2 + 0.00031 A_{eff} - 0.0208) \quad (C5)$$

The Δ1 and the Δ2 are characterized by satisfying Formula C6.

[Formula C6]

$$-0.7\% \leq \Delta_1 \leq -0.49\%$$

$$-0.4\% \leq \Delta_2 \leq -0.27\% \quad (C6)$$

The parameters of the multicore optical fiber according to the present invention can also be expressed as follows:

The present multicore optical fiber includes:

four cores having a radius $a_1$ disposed in a longitudinal direction in square lattice shape;

a first cladding region disposed around the core and having a radius $a_2$ with a refractive index lower than the refractive index of the core, a specific relative refractive index difference between the cladding region and the core being $\Delta_1$; and a second cladding region disposed on an outer periphery of the first cladding region and having a refractive index higher than the refractive index of the first cladding region and lower than the refractive index of the core, a specific relative refractive index difference between the cladding region and the core being $\Delta_2$, in which $a_2/a_1 = 2.0$ and an effective cross-sectional area at a wavelength of 1550 nm is 80 μm², and when the specific relative refractive index difference of the first cladding region is represented by an axis of abscissas and the specific relative refractive index difference of the second cladding region is represented by an axis of ordinates, it is characterized in that the $\Delta_1$ and the $\Delta_2$ are within a range enclosed by:

A0 (−0.800, −0.396)

A1a (−0.800, −0.340)

A1b (−0.750, −0.351)

A1 (−0.682, −0.378)

The present multicore optical fiber includes:

four cores having a radius $a_1$ disposed in a longitudinal direction in square lattice shape;

a first cladding region disposed around the core and having a radius $a_2$ with a refractive index lower than the refractive index of the core, a specific relative refractive index difference between the cladding region and the core being $\Delta_1$; and a second cladding region disposed on an outer periphery of the first cladding region and having a refractive index higher than the refractive index of the first cladding region and lower than the refractive index of the core, a specific relative refractive index difference between the cladding region and the core being $\Delta_2$, in which $a_2/a_1=3.0$ and an effective cross-sectional area at a wavelength of 1550 nm is 80 μm², and when the specific relative refractive index difference of the first cladding region is represented by an axis of abscissas and the specific relative refractive index difference of the second cladding region is represented by an axis of ordinates, it is characterized in that the $\Delta_1$ and the $\Delta_2$ are within a range enclosed by:

B0a (−0.700, −0.376)
B1a (−0.700, −0.266)
B1b (−0.671, −0.286)
B1c (−0.618, −0.313)
B1d (−0.586, −0.338)
B1 (−0.490, −0.396)
B0d (−0.586, −0.400)
B0c (−0.618, −0.391)
B0b (−0.671, −0.371)

The present multicore optical fiber includes:

four cores having a radius $a_1$ disposed in a longitudinal direction in square lattice shape;

a first cladding region disposed around the core and having a radius $a_2$ with a refractive index lower than the refractive index of the core, a specific relative refractive index difference between the cladding region and the core being $\Delta_1$; and a second cladding region disposed on an outer periphery of the first cladding region and having a refractive index higher than the refractive index of the first cladding region and lower than the refractive index of the core, a specific relative refractive index difference between the cladding region and the core being $\Delta_2$, in which $a_2/a_1=3.0$ and an effective cross-sectional area at a wavelength of 1550 nm is 100 μm², and when the specific relative refractive index difference of the first cladding region is represented by an axis of abscissas and the specific relative refractive index difference of the second cladding region is represented by an axis of ordinates, the $\Delta_1$ and the $\Delta_2$ are within a range enclosed by:

C0a (−0.600, −0.274)
C1a (−0.600, −0.255)
C1b (−0.590, −0.262)
C1c (−0.570, −0.277)
C1 (−0.528, −0.305)
C0c (−0.570, −0.297)
C0b (−0.590, −0.289)

The parameters of the aforementioned multicore optical fiber are designed as follows:

The present multicore optical fiber includes:

four cores having a radius $a_1$ disposed in a longitudinal direction in square lattice shape;

a first cladding region disposed around the core and having a radius $a_2$ with a refractive index lower than the refractive index of the core, a specific relative refractive index difference between the cladding region and the core being $\Delta_1$; and a second cladding region disposed on an outer periphery of the first cladding region and having a refractive index higher than the refractive index of the first cladding region and lower than the refractive index of the core, a specific relative refractive index difference between the cladding region and the core being $\Delta_2$, the multicore optical fiber executing:

a first step of selecting a combination of the $a_1$ and the $\Delta_1$ from requirements for effective cross-sectional area $A_{eff}$ (μm²) and a total value XT (dB/km) of inter-core crosstalk per km;

a second step of selecting the $a_2$ and the $\Delta_2$ that satisfy requirements for a cutoff wavelength and bending loss in the combination selected in the first step and acquiring a core interval relationship between the $\Delta_1$ with respect to the XT and a core interval Λ, and an OCT relationship between the $\Delta_1$ and a shortest distance OCT from the outer periphery of the second cladding region to a center of the core with respect to requirements for an excessive loss $\alpha_c$; and a third step of calculating an outer diameter ϕ of the second cladding region at the $\Delta_1$ acquired in the first step using the core interval relationship and the OCT relationship acquired in the second step according to:

$$\phi=2\times(\Lambda/\sqrt{2}+OCT)$$

and determining whether the outer diameter ϕ becomes less than 125 μm or not.

Here, it is characterized in that when $A_{eff}$ is 80 μm² or more, the combination that satisfies Formula C1 and Formula C2 is selected in the first step. It is characterized in that when $a_2/a_1$ is 3.0 or less, the Δ2 that satisfies Formula C3 is selected in the second step.

Furthermore, the optical transmission method according to the present invention is characterized in that the multicore optical fiber of 1000 km or more is used as an optical transmission path, signal light having a wavelength of 1530 nm or more is transmitted from four transmitters for each core of the multicore optical fiber, and four receivers receive the signal light for each core of the multicore optical fiber.

The optical transmission method according to the present invention is characterized in that a single mode optical fiber of a submarine communication system having a communication distance of 1000 km or more is replaced by the multicore optical fiber, signal light having a wavelength of 1530 nm or more is transmitted from four transmitters for each core of the multicore optical fiber, and four receivers receive the signal light for each core of the multicore optical fiber.

The multicore optical fiber according to the present invention includes four cores and realizes the second cladding having a diameter of 125 μm and XT of −54 dB/km or less. These are the characteristics unachieved by any one of the multicore optical fibers according to Non-Patent Literatures 3 to 6. Thus, the present multicore optical fiber can replace single mode optical fibers currently used in long-distance optical communication systems such as submarine communication systems, and since the multicore optical fiber is provided with four cores, the multicore optical fiber can drastically increase transmission capacity and reduce power consumption.

Effects of the Invention

The present invention can provide a multicore optical fiber including four cores having a standard cladding diameter of 125±1 μm for existing single mode optical fibers and supporting transmission in several thousands of kilometers, a design method for the multicore optical fiber and an optical transmission method using the multicore optical fiber.

The present multicore optical fiber has effects of providing a high density, high capacity MCF suitable for ultra-long distance communication such as submarine systems, including four cores having a standard cladding diameter and capable of achieving optical characteristics having compatibility with existing optical fibers and realizing XT that enables transmission in several thousands of kilometers.

BRIEF DESCRIPTION OF DRAWINGS

FIG. 19 is a table describing evaluation results of the multicore optical fiber according to the present invention.

DESCRIPTION OF EMBODIMENTS

Figure 1:
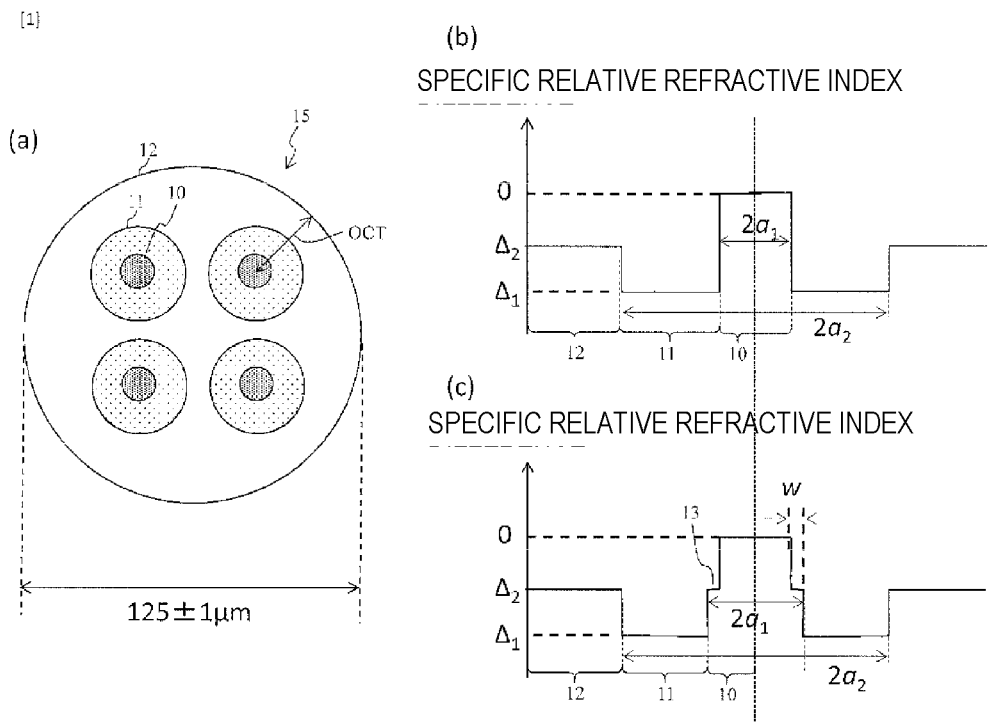
FIG. 1 is a diagram illustrating an example of a structure of a multicore optical fiber according to the present invention.

Embodiments of the present invention will be described with reference to the accompanying drawings. The embodiments described hereinafter are examples of the present invention, and the present invention is not limited to the following embodiments. Note that components assigned the same reference numerals in the present Description and drawings denote the same components.

FIG. 1 is a diagram illustrating an example of a structure of an optical fiber 15 according to the present embodiment. FIG. 1(*a*) illustrates a cross-sectional structure, FIG. 1(*b*) and FIG. 1(*c*) illustrate a refractive index distribution of each core. The optical fiber 15 is a multicore optical fiber including:

four cores 10 having a radius a1 disposed in a longitudinal direction in square lattice shape;

a first cladding region 11 disposed around the core 10 and having a radius a2 with a refractive index lower than the refractive index of the core, a specific relative refractive index difference between the cladding region and the core being Δ1; and a second cladding region 12 disposed on an outer periphery of the first cladding region 11 and having a refractive index higher than the refractive index of the first cladding region and lower than the refractive index of the core, a specific relative refractive index difference between the cladding region and the core being Δ2.

In the optical fiber 15, an outer diameter of the second cladding region 12 is 125±1 μm, an effective cross-sectional area at a wavelength of 1550 nm is 80 μm² or more, bending loss at a wavelength of 1625 nm and a bending radius of 30 mm is 0.1 dB/100 turns or less, and a cutoff wavelength is 1530 nm or less.

The optical fiber 15 includes four cores in one optical fiber having a standard cladding diameter (outer diameter of the second cladding region 12) of 125±1 μm.

As shown in FIG. 1(b), a refractive index distribution of each core includes the first cladding region 11 around the core 10 and having a refractive index lower than the refractive index of the core and includes the second cladding region 12 therearound and having a refractive index lower than the refractive index of the core and higher than the refractive index of the first cladding region. As shown in FIG. 1(c), a region 13 having a refractive index equivalent to the refractive index of the second cladding region 12 may also be included between the core 10 and the first cladding region 11.

Figure 2:
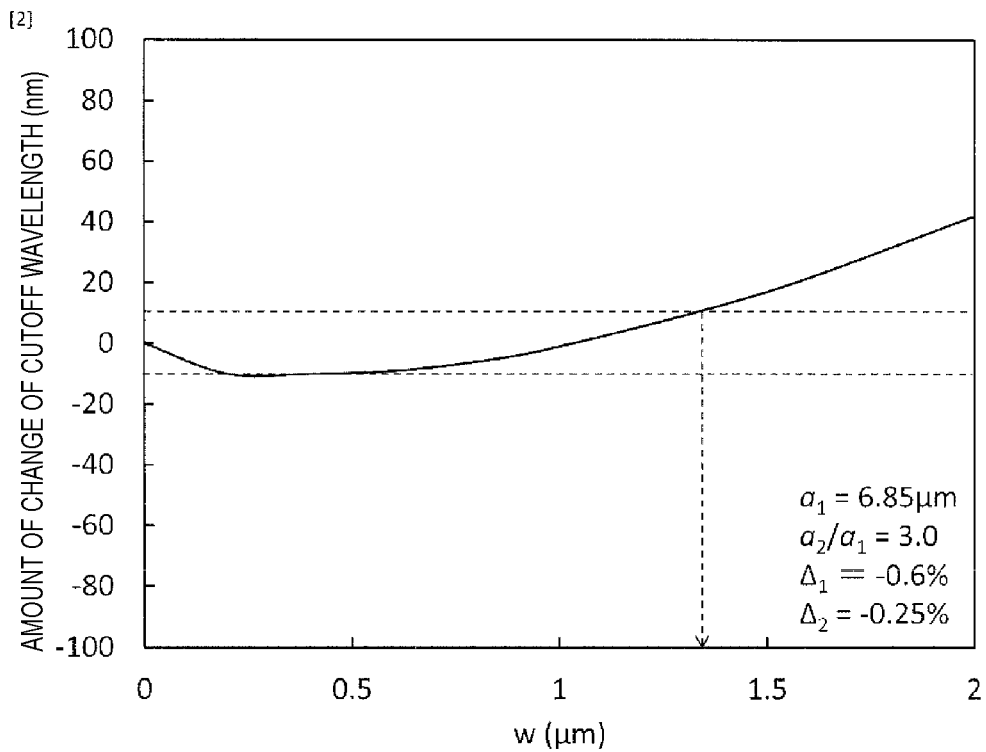
FIG. 2 is a diagram illustrating influences of a width w of the multicore optical fiber according to the present invention.

Regarding the refractive index distribution in FIG. 1(c), FIG. 2 illustrates an amount of change in a cutoff wavelength with respect to a width w of the region 13. As shown in FIG. 2, even when the region 13 having a refractive index equivalent to the refractive index of the second cladding region 12 exists between the core 10 and the first cladding region 11, the amount of change in the cutoff wavelength is small. It can be confirmed from the diagram that when the width w is 1.3 μm or less, the amount of change in the cutoff wavelength is ±10 nm, which is equivalent to a measurement error, and the refractive index distributions in FIG. 1(b) and FIG. 1(c) can be regarded as equivalent. Adopting the structure in FIG. 1(c) can reduce fluctuations in the core structure during manufacturing, and in the case of pure quartz, for example, the structure is more stable regarding the refractive index of the second cladding region, and it is possible to improve manufacturing deviation or yield, which is therefore preferable.

Note that although the specific relative refractive index difference is defined using the refractive index of the core as a reference here, the materials of the core and the cladding can be selected from among combinations of glass materials that can constitute the refractive index distribution shown in FIG. 1 such as a combination of pure quartz and fluorine added glass or a combination of GeO2 added glass, pure quartz glass and fluorine added glass.

The "cutoff wavelength" of an optical fiber refers to a condition under which single mode propagation is possible, and light propagates in a single mode when the wavelength of the light is longer than the cutoff wavelength or light propagates in a multimode when the wavelength of the light is shorter than the cutoff wavelength.

Figure 3:
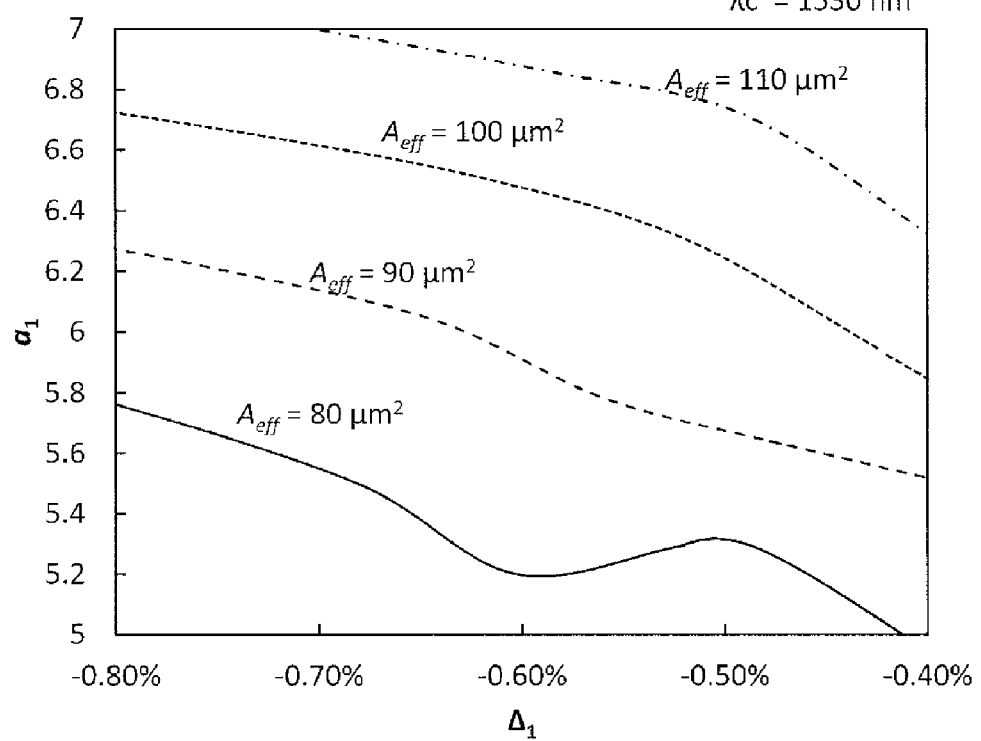
FIG. 3 is a characteristic diagram expressing a relationship between an effective cross-sectional area and structural parameters of the multicore optical fiber according to the present invention.
Figure 4:
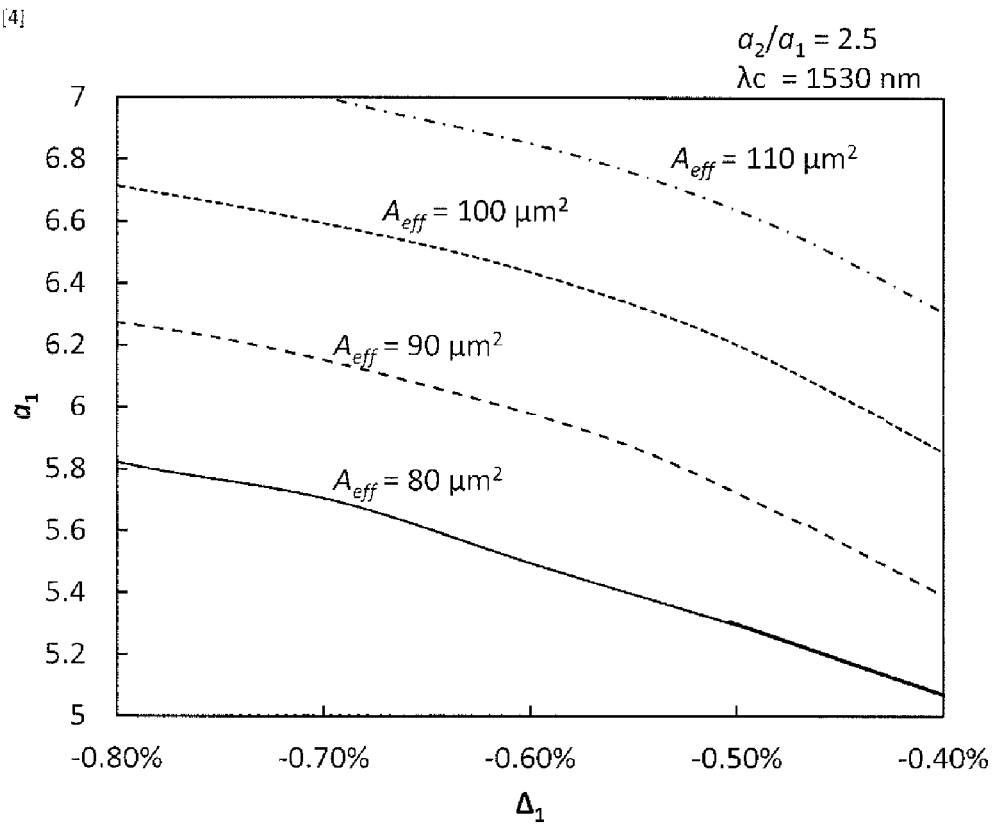
FIG. 4 is a characteristic diagram expressing a relationship between an effective cross-sectional area and structural parameters of the multicore optical fiber according to the present invention.
Figure 5:
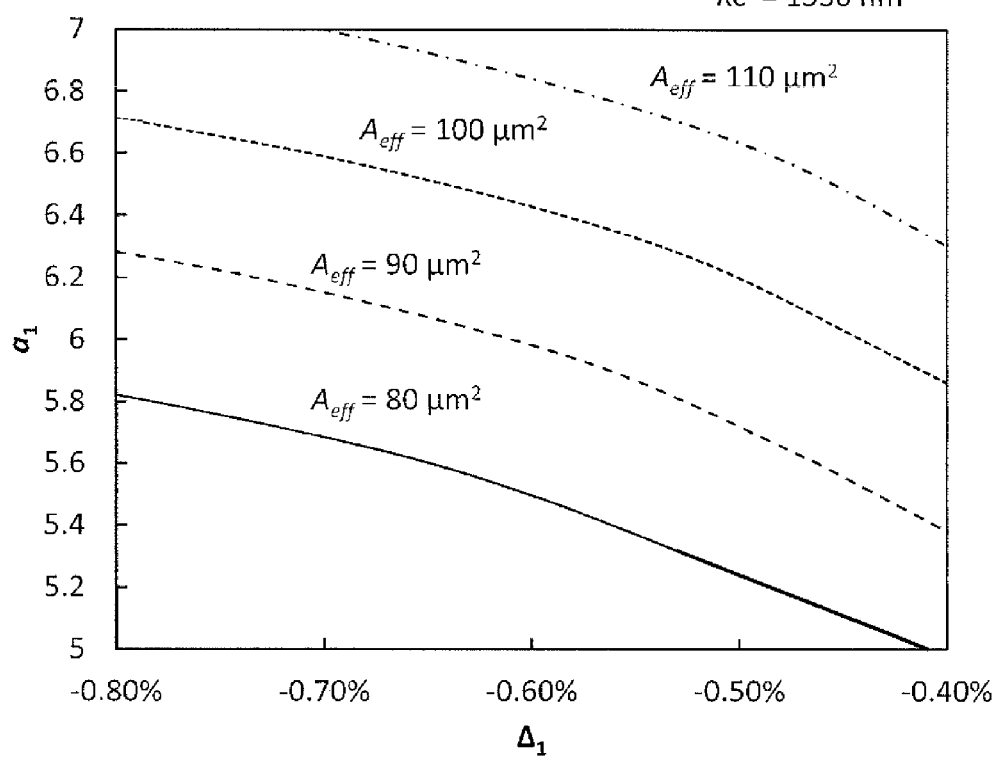
FIG. 5 is a characteristic diagram expressing a relationship between an effective cross-sectional area and structural parameters of the multicore optical fiber according to the present invention.

FIG. 3 to FIG. 5 are diagrams illustrating a design range of core parameters to obtain a predetermined effective cross-sectional area $A_{eff}$ of the optical fiber 15 at a wavelength of 1550 nm. The axis of abscissas represents a specific relative refractive index difference $\Delta_1$ with respect to the core of the first cladding region 11 and the axis of ordinates represents a radius a1 of the core 10. FIG. 3 to FIG. 5 illustrate cases where the ratio $a_2/a_1$ of the core radius $a_1$ to the radius $a_2$ of the first cladding region 11 region is changed from 2.0 to 2.5 to 3.0 respectively. The specific relative refractive index difference Δ of the cladding with respect to the core is set so that the cutoff wavelength becomes 1530 nm.

Comparing FIG. 3 to FIG. 5, the relationship between $a_1$ and $\Delta_1$ to obtain constant $A_{eff}$ is substantially the same. It is considered that this is because the electric field distribution is confined in a region surrounded by the first cladding region 11, and so dependency on the parameters $a_2$ and $\Delta_2$ (specific relative refractive index difference of the second cladding region 12 with respect to the core) relating to the second cladding region 12 is small.

Here, a conventional SMF has an $A_{eff}$ of approximately 80 μm² at a wavelength of 1550 nm and the $A_{eff}$ is preferably 80 μm² or more to secure connectivity and low non-linearity equal to or better than conventional. From FIG. 3 to FIG. 5, in order to set $A_{eff}$ to 80 μm²,

[Formula 1]

$$a_1 \geq -28041\Delta_1^2 - 560.65\Delta_1 + 3.1369 \quad (1)$$

needs to be satisfied according to an approximate curve shown by the solid line.

It is known that the core interval needs to be increased by a certain amount in MCF to reduce XT. Deterioration of transmission characteristics caused by XT depends on a transmission scheme and Non-Patent Literature 7 shows that crosstalk should be reduced to −18 dB, −24 dB and −32 dB or less for QPSK, 16QAM and 64QAM respectively. In the case of a multicore optical fiber, inter-core crosstalk is a sum total of crosstalk components from other cores to a given core and crosstalk at a given distance with respect to crosstalk (XT, unit dB/km) per unit distance and a distance L (km) is given by XT+log(L).

Therefore, in order to perform transmission in 1000 to 10000 km using, for example, a 16QAM signal format, crosstalk of a multicore optical fiber needs to be −54 to −64 dB/km or less. Reducing crosstalk requires the core interval to be increased by a certain amount, but it is known that when the cladding diameter is constant, a thickness (OCT) between a core and a cladding end decreases as the core interval increases, an excessive loss $\alpha_c$ is generated due to light wave leakage.

Figure 6:
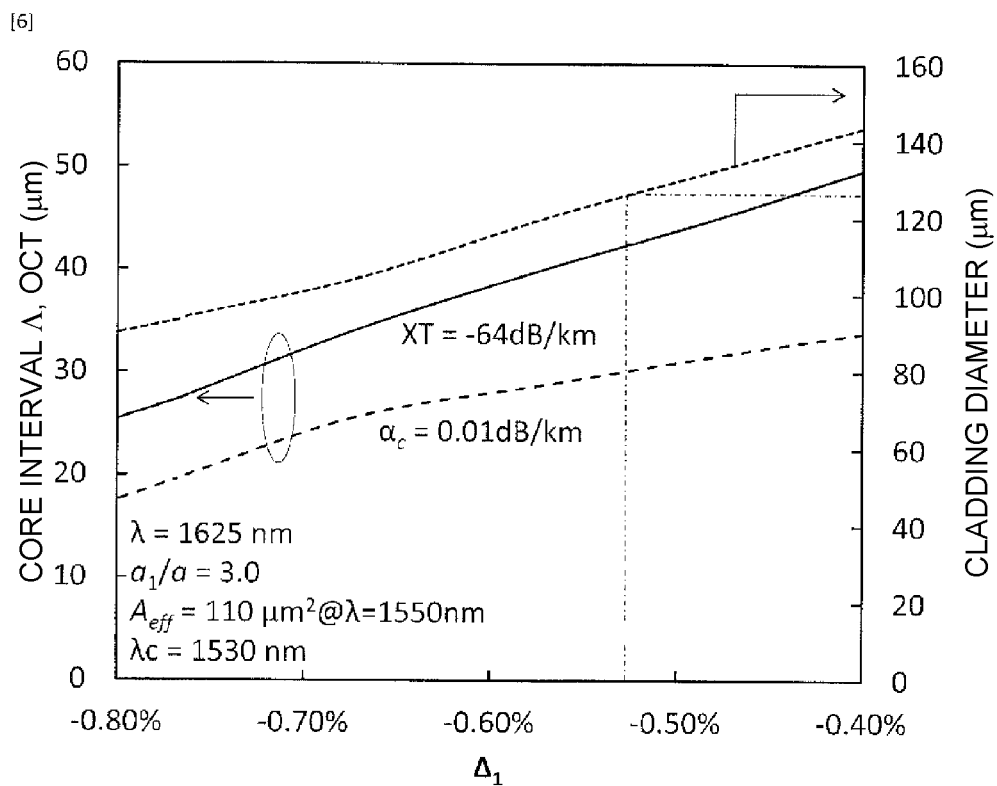
FIG. 6 is a characteristic diagram expressing an example of a relationship between core arrangement, XT and excessive loss of the multicore optical fiber according to the present invention.

FIG. 6 is a diagram illustrating a design example of the optical fiber 15 to reduce inter-core crosstalk (XT) and excessive loss $\alpha_c$. The axis of abscissas represents a specific relative refractive index difference $\Delta_1$ of the first cladding region 11, a first axis of ordinates represents a core interval Λ or OCT, and a second axis of ordinates represents an outer diameter of the second cladding region 12. Since XT and the excessive loss increase as the wavelength increases, the wavelength is assumed to be 1625 nm in consideration of utilization of an entire C+L bandwidth. The solid line shows a core interval Λ (μm) where XT becomes −64 dB/km and the broken line shows OCT where the excessive loss $\alpha_c$ becomes 0.01 dB/km. That is, XT becomes less than −64 dB/km in a region above the solid line and $\alpha_c$ becomes less than 0.01 dB/km in a region above the broken line.

The dotted line shows a "necessary cladding diameter" for XT to satisfy −64 dB/km and for $a_c$ to satisfy 0.01 dB/km, and in the case of a 4-core arrangement, the necessary cladding diameter=2×(Λ/√2+OCT).

Here $a_2/a_1=3.0$ and $a_1$ and $\Delta_2$ are set so that $A_{eff}$ becomes 110 μm² and the cutoff wavelength $\lambda_c$ becomes 1530 nm.

It is seen from FIG. 6 that light wave confinement becomes weak as $\Delta_1$ increases, and the core interval Λ and OCT necessary to obtain a desired XT and $\alpha_c$ increase. In the case of FIG. 6, $\Delta_1$ needs to be −0.52% in order to set the cladding diameter to 125±1 μm (see single-dot dashed line). The necessary core interval Λ and OCT at this time are 42.5 μm and 30 μm respectively. Note that the core interval and the OCT shown in FIG. 6 are minimum values that satisfy the predetermined XT and the excessive loss, and setting larger values will cause the XT and the excessive loss to have smaller values. That is, if $\Delta_1$ is set to less than −0.52% in order to set the cladding diameter to 125±1 μm, the necessary cladding diameter becomes 125 μm or less, providing room for the design of Λ and OCT.

Figure 7:
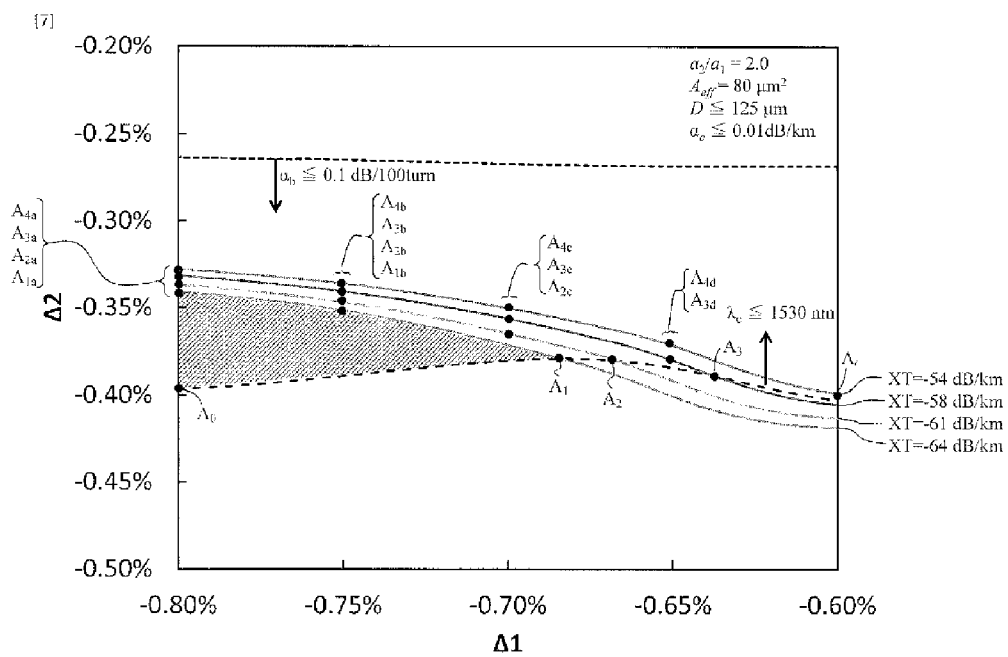
FIG. 7 is a characteristic diagram expressing a relationship of structural parameters of the multicore optical fiber according to the present invention in which the cladding diameter is 125±1 μm or less under a predetermined cutoff wavelength, bending loss and an effective cross-sectional area.
Figure 8:
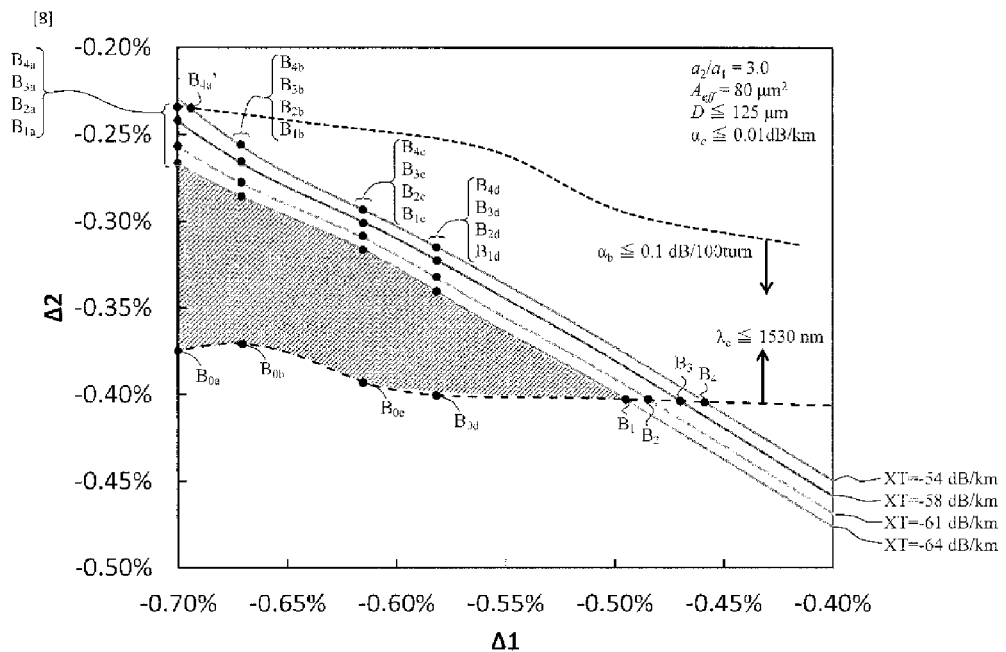
FIG. 8 is a characteristic diagram expressing a relationship of structural parameters of the multicore optical fiber according to the present invention in which the cladding diameter is 125±1 μm or less under a predetermined cutoff wavelength, bending loss and an effective cross-sectional area.
Figure 9:
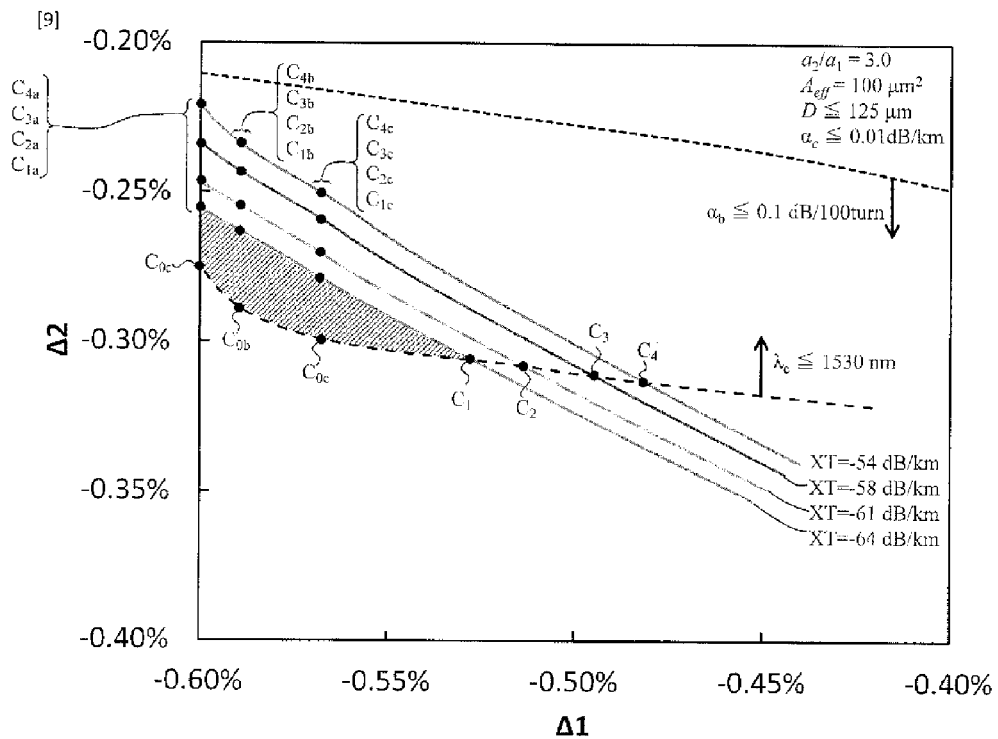
FIG. 9 is a characteristic diagram expressing a relationship of structural parameters of the multicore optical fiber according to the present invention in which the cladding diameter is 125±1 μm or less under a predetermined cutoff wavelength, bending loss and an effective cross-sectional area.

FIG. 7 to FIG. 9 are diagrams illustrating examples of structural parameters of the optical fiber 15 having a cutoff wavelength of 1530 nm or less, bending loss of 0.1 dB/100 turns or less at a wavelength of 1625 nm and a bending radius of 30 mm and a necessary cladding diameter of 125±1 μm. In all the drawings, the aforementioned conditions (XT is −64 dB/km or less and $\alpha_c$ is 0.01 dB/km or less) can be satisfied simultaneously in the shaded regions.

FIG. 7 shows a case where $A_{eff}$ is 80 μm² at a wavelength of 1550 nm, and $a_2/a_1$=2.0, FIG. 8 shows a case where $A_{eff}$ is 80 μm² at a wavelength of 1550 nm, and $a_2/a_1$=3.0, and FIG. 9 shows a case where $A_{eff}$ is 110 μm² at a wavelength of 1550 nm, and $a_2/a_1$=3.0.

In FIG. 7 to FIG. 9, the broken line shows a condition under which the cutoff wavelength becomes 1530 nm (the cutoff wavelength is 1530 nm or less in a region above the broken line) and the dotted line shows a condition under which the bending loss $\alpha_b$ becomes 0.1 dB/100 turns (the bending loss $\alpha_b$ is 0.1 dB/100 turns or less in a region below the dotted line).

In FIG. 7 to FIG. 9, the solid line shows a condition of XT at a wavelength of 1625 nm and XT becomes −54 dB/km or less, −58 dB/km or less, −61 dB/km or less and −64 dB/km or less respectively in a region below the solid line.

The region that satisfies all the conditions is a region surrounded by the solid line, the broken line and the dotted line, and when, for example, XT is set to −64 dB/km or less, the region corresponds to a shaded region in the diagram. From FIG. 7 to FIG. 9, an upper limit of $\Delta_1$ and a lower limit of $\Delta_2$ are determined by requirements for XT and cutoff wavelength, and the lower limit of $\Delta_2$ has a relatively smaller change than $\Delta_1$. Therefore, the upper limit of $\Delta_1$ and the lower limit of $\Delta_2$ can be given by an intersection of the solid line and the broken line. It is also seen from FIG. 7 to FIG. 9 that the designable region becomes alleviated as the $a_2/a_1$ is larger and the required $A_{eff}$ is smaller.

Therefore, when $A_{eff}$ is 80 μm² or more, the cutoff wavelength is 1530 nm or less and XT is −64 dB/km or less, FIG. 8 includes the largest region, and in this case,

[Formula 2]

$$-0.7\% \leq \Delta_1 \leq -0.49\%$$
$$-0.4\% \leq \Delta_2 \leq -0.27\% \qquad (2)$$

In FIG. 7, if X coordinate is assumed to be Δ1 and Y coordinate is assumed to be Δ2, the shaded region, that is, the region that satisfies:

$a_2/a_1$=2.0,
$A_{eff}$=80 μm² at a wavelength of 1550 nm,
cladding diameter D≤125 μm,
excessive loss $\alpha_c$≤0.01 dB/km,
cutoff wavelength λc≤1530 nm,
bending loss $\alpha_b$≤0.1 dB/100 turns, and
XT≤−64 dB/km is a range surrounded by:
A0 (−0.800, −0.396)
A1a (−0.800, −0.340)
A1b (−0.750, −0.351)
A1 (−0.682, −0.378).

Note that if the region satisfies XT≤−61 dB/km, it is a range surrounded by:
A0 (−0.800, −0.396)
A2a (−0.800, −0.335)
A2b (−0.750, −0.346)
A2c (−0.700, −0.363)
A2 (−0.668, −0.380).

If the region satisfies XT≤−58 dB/km, it is a range surrounded by:
A0 (−0.800, −0.396)
A3a (−0.800, −0.331)
A3b (−0.750, −0.339)
A3c (−0.700, −0.355)
A3d (−0.650, −0.380)
A3 (−0.639, −0.387).

If the region satisfies XT≤−54 dB/km, it is a range surrounded by:
A0 (−0.800, −0.396)
A4a (−0.800, −0.328)
A4b (−0.750, −0.323)
A4c (−0.700, −0.349)
A4d (−0.650, −0.370)
A4 (−0.600, −0.400).

In FIG. 8, if X coordinate is assumed to be Δ1 and Y coordinate is assumed to be Δ2, the shaded region, that is, the region that satisfies:

$a_2/a_1$=3.0,
$A_{eff}$=80 μm² at a wavelength of 1550 nm,
cladding diameter D≤125 μm,
excessive loss $\alpha_c$≤0.01 dB/km,
cutoff wavelength λc≤1530 nm,
bending loss $\alpha_b$≤0.1 dB/100 turns, and
XT≤−64 dB/km is a range surrounded by:
B0a (−0.700, −0.376)
B1a (−0.700, −0.266)
B1b (−0.671, −0.286)
B1c (−0.618, −0.313)
B1d (−0.586, −0.338)
B1 (−0.490, −0.396)
B0d (−0.586, −0.400)
B0c (−0.618, −0.391)
B0b (−0.671, −0.371).

Note that if the region satisfies XT≤−61 dB/km, it is a range surrounded by:
B0a (−0.700, −0.376)
B2a (−0.700, −0.256)
B2b (−0.671, −0.278)
B2c (−0.618, −0.306)
B2d (−0.586, −0.329)
B2 (−0.484, −0.396)
B0d (−0.586, −0.400)
B0c (−0.618, −0.391)
B0b (−0.671, −0.371).

If the region that satisfied XT≤−58 dB/km, it is a range surrounded by:
B0a (−0.700, −0.376)
B3a (−0.700, −0.242)
B3b (−0.671, −0.267)
B3c (−0.618, −0.299)
B3d (−0.586, −0.319)
B3 (−0.470, −0.396)
B0d (−0.586, −0.400)
B0c (−0.618, −0.391)
B0b (−0.671, −0.371).

If the region that satisfies XT≤−54 dB/km, it is a range surrounded by:
B0a (−0.700, −0.376)
B4a (−0.700, −0.234)
B4b (−0.671, −0.256)
B4c (−0.618, −0.278)
B4d (−0.586, −0.312)
B4 (−0.458, −0.396)
B0d (−0.586, −0.400)
B0c (−0.618, −0.391)
B0b (−0.671, −0.371).

In FIG. 9, if X coordinate is assumed to be Δ1 and Y coordinate is assumed to be Δ2, the shaded region, that is, the region that satisfies:

$a_2/a_1=3.0$, $A_{eff}=110$ μm² at a wavelength of 1550 nm
cladding diameter D≤125 μm,
excessive loss $\alpha_c$≤0.01 dB/km,
cutoff wavelength λc≤1530 nm,
bending loss $\alpha_b$≤0.1 dB/100 turns, and
XT≤−64 dB/km
is a region surrounded by:
C0a (−0.600, −0.274)
C1a (−0.600, −0.255)
C1b (−0.590, −0.262)
C1c (−0.570, −0.277)
C1 (−0.528, −0.305)
C0c (−0.570, −0.297)
C0b (−0.590, −0.289).

Note that If the region that satisfies XT≤−61 dB/km, it is a region surrounded by:
C0a (−0.600, −0.274)
C2a (−0.600, −0.247)
C2b (−0.590, −0.254)
C2c (−0.570, −0.269)
C2 (−0.513, −0.308)
C0c (−0.570, −0.297)
C0b (−0.590, −0.289).

If the region that satisfies XT≤−58 dB/km, it is a region surrounded by:
C0a (−0.600, −0.274)
C3a (−0.600, −0.234)
C3b (−0.590, −0.242)
C3c (−0.570, −0.257)
C3 (−0.495, −0.311)
C0c (−0.570, −0.297)
C0b (−0.590, −0.289).

If the region that satisfies XT≤−54 dB/km, it is a region surrounded by:
C0a (−0.600, −0.274)
C4a (−0.600, −0.220)
C4b (−0.590, −0.233)
C4c (−0.570, −0.249)
C4 (−0.479, −0.313)
C0c (−0.570, −0.297)
C0b (−0.590, −0.289).

Figure 10:
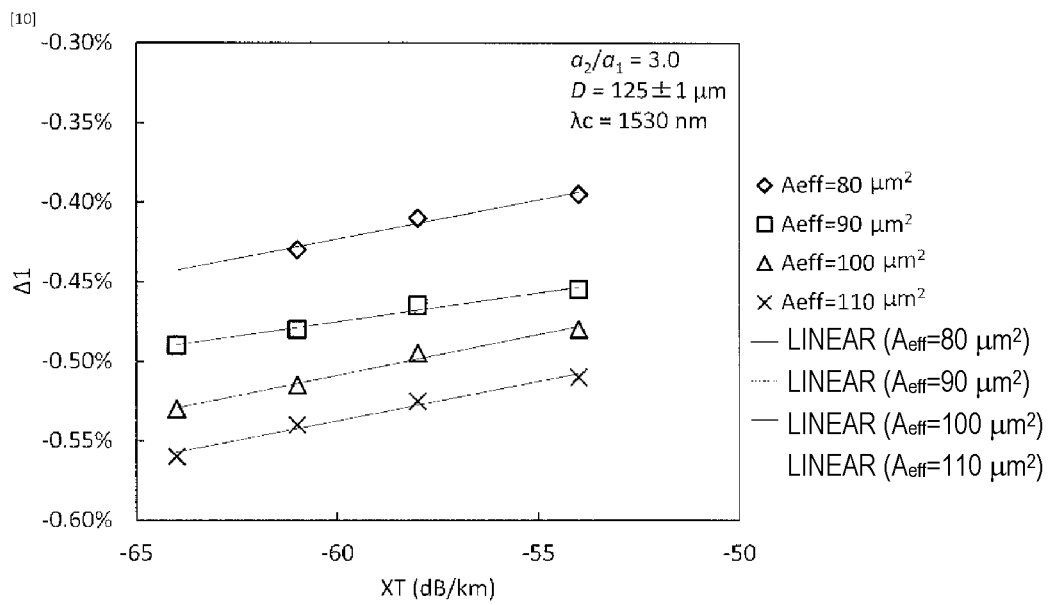
FIG. 10 is a characteristic diagram expressing a relationship between XT and a range of necessary structural parameters of the multicore optical fiber according to the present invention.
Figure 11:
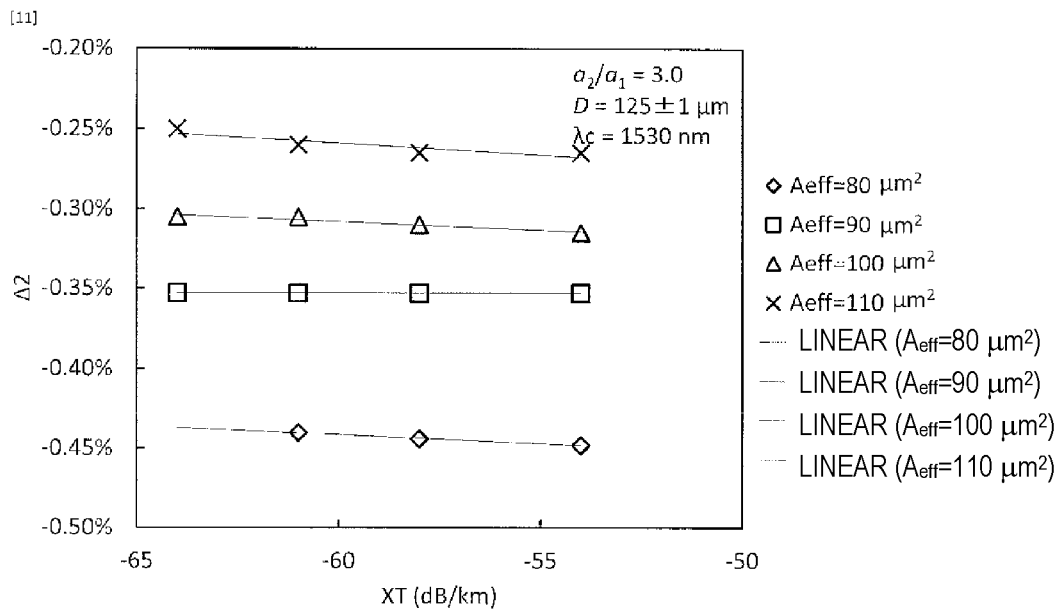
FIG. 11 is a characteristic diagram expressing a relationship between XT and a range of necessary structural parameters of the multicore optical fiber according to the present invention.

FIG. 10 and FIG. 11 are diagrams illustrating dependency on XT of the upper limit of $\Delta_1$ (FIG. 10) and the lower limit of $\Delta_2$ (FIG. 11) given by intersections of the cutoff wavelength λc (broken line) and the condition of XT (solid line) on the graphs created as shown in FIG. 7 to FIG. 9. Here, $a_2/a_1$ is assumed to be 3.0. It is seen from FIG. 10 and FIG. 11 that the upper limit of $\Delta_1$ and the lower limit of $\Delta_2$ linearly change with respect to the requirements for XT. If $A_{eff}$ is 80 μm² or more, it is seen from FIG. 10 and FIG. 11 that:

[Formula 3]

$$\Delta^1 \leq 4.93 \times 10^{-5} XT - 0.00127$$

$$\Delta_2 \geq -1.14 \times 10^{-5} XT - 0.00509 \quad (3)$$

Here, comparing FIG. 7 and FIG. 8, the upper limit of $\Delta_1$ decreases and the lower limit of $\Delta_2$ increases as $a_2/a_1$ decreases, and so when $a_2/a_1$ is smaller than 3.0, $a_2/a_1$ is included within ranges of the upper limit of Δ1 and the lower limit of Δ2 shown in Formula 3.

Figure 12:
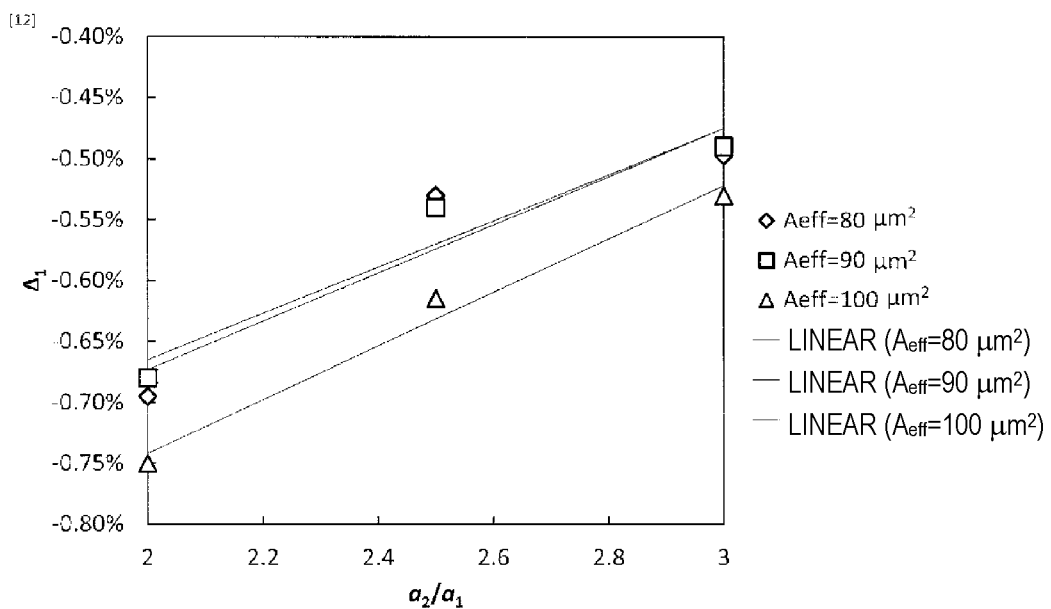
FIG. 12 is a characteristic diagram expressing a relationship of structural parameters of the multicore optical fiber according to the present invention in which the cladding diameter is 125 μm or less under a predetermined cutoff wavelength, bending loss and an effective cross-sectional area.
Figure 13:
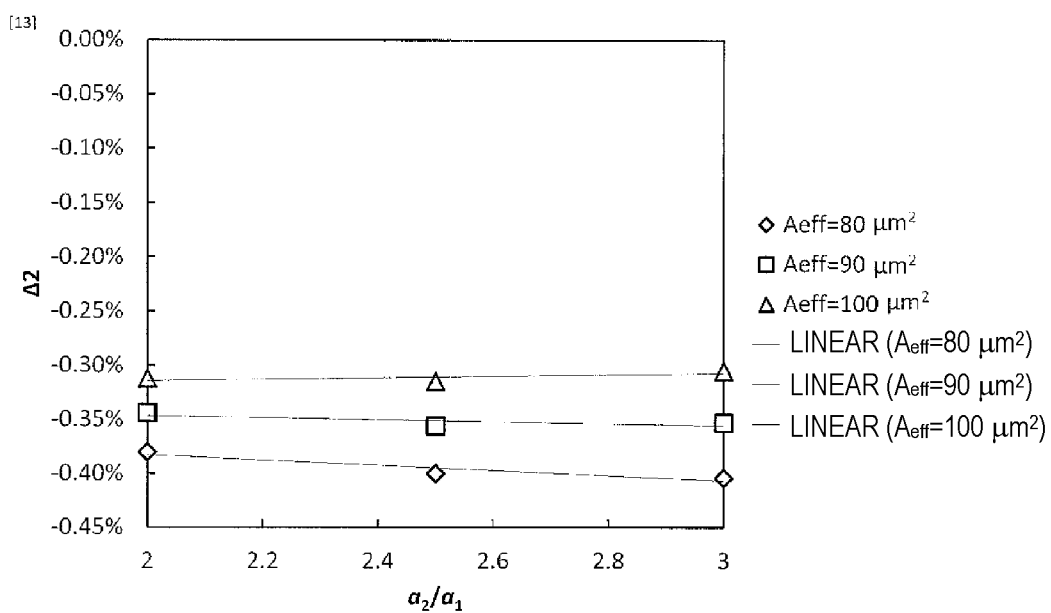
FIG. 13 is a characteristic diagram expressing a relationship of structural parameters of the multicore optical fiber according to the present invention in which the cladding diameter is 125 μm or less under a predetermined cutoff wavelength, bending loss and an effective cross-sectional area.
Figures 14, 15:
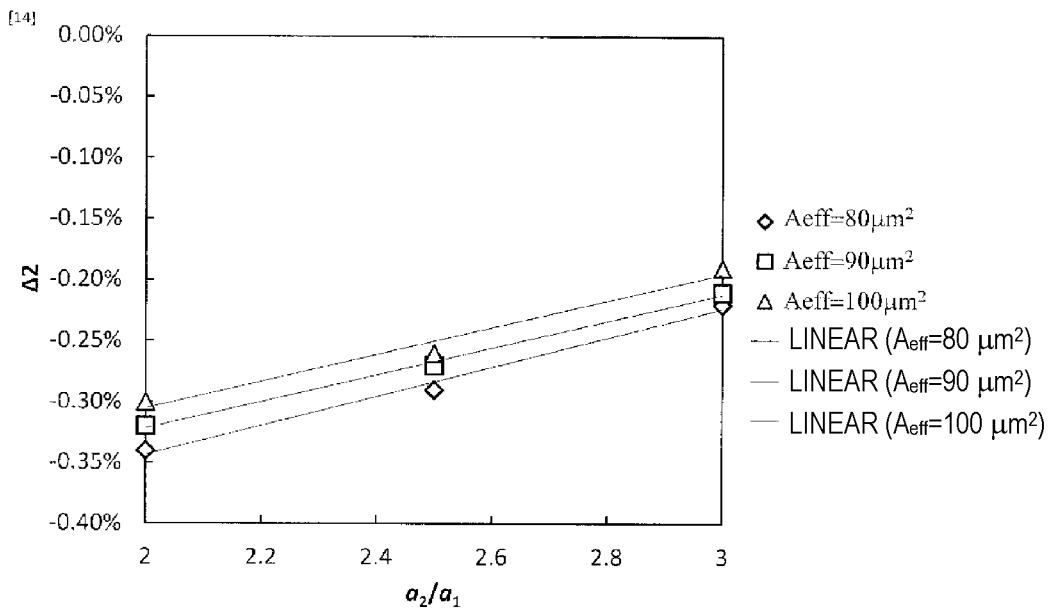
FIG. 14 is a characteristic diagram expressing a relationship of structural parameters of the multicore optical fiber according to the present invention in which the cladding diameter is 125 μm or less under between a predetermined cutoff wavelength, bending loss and an effective cross-sectional area.
FIG. 15 is a table illustrating a design example of the multicore optical fiber according to the present invention.

FIG. 12 to FIG. 14 are diagrams illustrating dependency on $a_2/a_1$ of the upper limit of $\Delta_1$ (FIG. 12), the lower limit of $\Delta_2$ (FIG. 13) and the upper limit of $\Delta_2$ (FIG. 14) given by intersections of the cutoff wavelength λc (broken line) and the condition of XT (solid line) on the graphs created as shown in FIG. 7 to FIG. 9. Straight lines in the respective drawings are the results of linear approximation.

Here, the requirements for XT are assumed to be −64 dB/km. It is seen from FIG. 12 to FIG. 14 that the upper limit of $\Delta_1$, the lower limit of $\Delta_2$ ($\Delta_{2\_min}$) and the upper limit of $\Delta_2$ ($\Delta_{2\_max}$) can be approximated relatively better with respect to $a_2/a_1$ through linear approximation. It is seen from FIG. 12 to FIG. 14 that: With respect to:
$A_{eff}=80$ μm²,

[Formula 4]

$$\Delta_1 = 0.0020 a_2/a_1 - 0.01069$$

$$\Delta_{2\_min} = -0.00024 a_2/a_1 - 0.00335$$

$$\Delta_{2\_max} = 0.0012 a_2/a_1 - 0.005833 \quad (4)$$

With respect to:
$A_{eff}=90$ μm²,

[Formula 5]

$$\Delta_1 = 0.0019 a_2/a_1 - 0.01045$$

$$\Delta_{2\_min} = 9 \times 10^{-5} a_2/a_1 - 0.00329$$

$$\Delta_{2\_max} = 0.0011 a_2/a_1 - 0.005417 \quad (5)$$

With respect to:
$A_{eff}=100$ μm²,

[Formula 6]

$$\Delta_1 = 0.0022 a_2/a_1 - 0.01182$$

$$\Delta_{2\_min} = -7 \times 10^{-5} a_2/a_1 - 0.00328$$

$$\Delta_{2\_max} = 0.0011 a_2/a_1 - 0.00525. \quad (6)$$

When approximate curves of coefficients of Formula 4 to Formula 6 are taken,

[Formula 7]

$$\Delta_1 \leq (1.9 \times 10^{-6} A_{eff}^2 - 0.00033 A_{eff} + 0.0163) a_2/a_1 + (-8.0 \times 10^{-6} A_{eff}^2 + 0.00139 A_{eff} - 0.0705)$$

$$\Delta_2 \geq (5.0 \times 10^{-8} A_{eff}^2 + 6.5 \times 10^{-6} A_{eff} - 0.00108) a_2/a_1 + (-2.9 \times 10^{-7} A_{eff}^2 + 5.58 \times 10^{-5} A_{eff} - 0.00594)$$

$$\Delta_2 \leq (5.0 \times 10^{-7} A_{eff}^2 - 9.5 \times 10^{-5} A_{eff} - 0.0056) a_2/a_1 + (-1.6 \times 10^{-6} A_{eff}^2 + 0.00031 A_{eff} - 0.0208) \quad (7)$$

Within the parameter range that satisfies Formula 7, it is possible to realize an optical fiber having a standard cladding diameter of 125 μm, with four cores and having characteristics equivalent to existing optical fibers.

FIG. 15 shows structural parameters and optical characteristics designed within the design range of Formula 7. The 4-core optical fibers in design examples (1) and (2) have $A_{eff}$ of 85 μm² and 102 μm², acquire single mode operation in a C band and an L band, and have bending loss equivalent to or less than conventional SMF.

Figure 16:
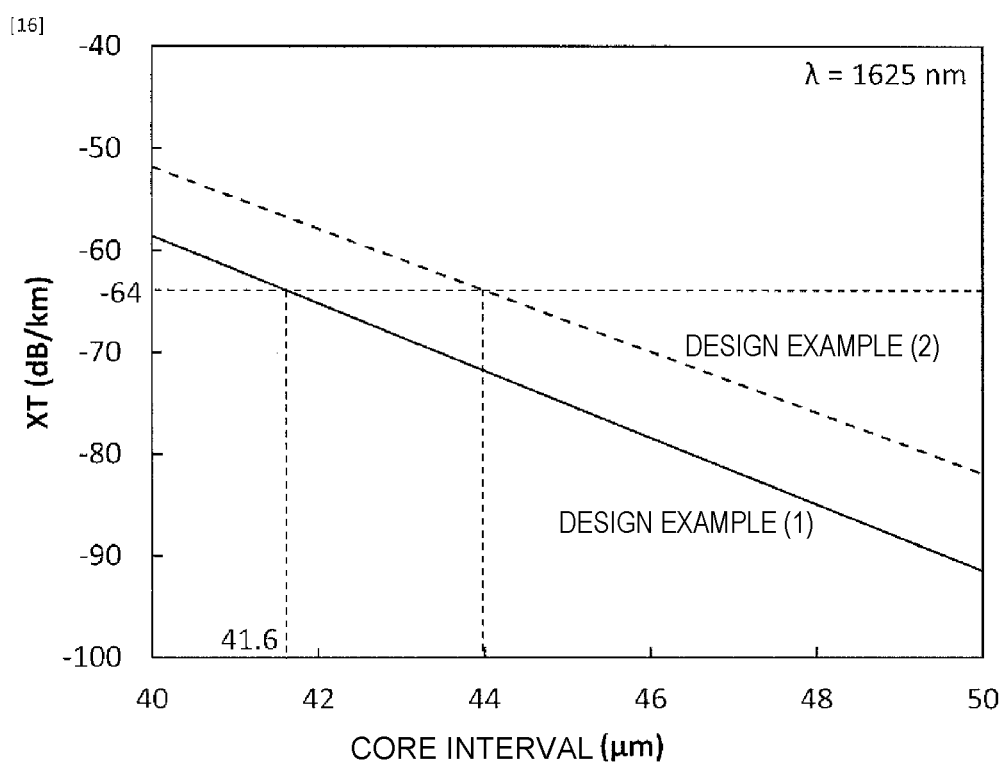
FIG. 16 is a characteristic diagram illustrating a relationship between a core interval and XT in a design example of the multicore optical fiber according to the present invention.
Figure 17:
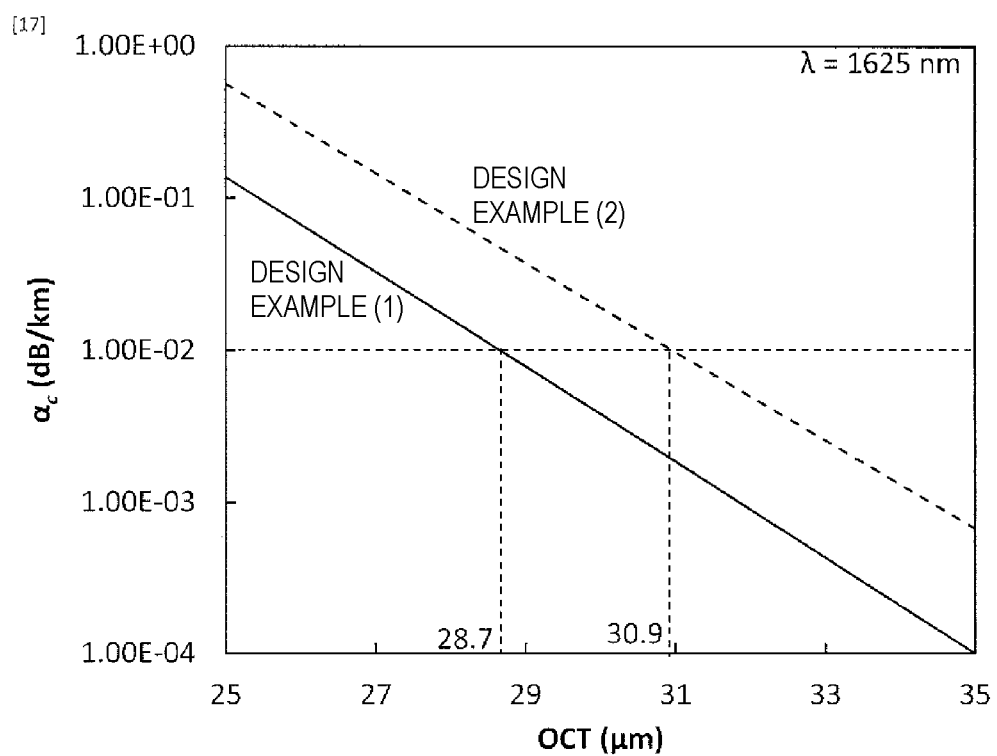
FIG. 17 is a characteristic diagram illustrating a relationship between OCT and excessive loss in a design example of the multicore optical fiber according to the present invention.

FIG. 16 and FIG. 17 show XT characteristics and excessive loss corresponding to the design example shown in FIG. 15. The wavelength is 1625 nm.

FIG. 16 is a diagram illustrating a relationship between a core interval and XT. In order to obtain XT of −64 dB/km or less, core intervals of 41.6 μm or less and 44 μm or less are necessary with respect to design example (1) and design example (2) respectively.

FIG. 17 illustrates a relationship between OCT and excessive loss $\alpha_c$. In order to obtain excessive loss of 0.01 dB/km or less, OCTs of 28.7 μm or less and 30.9 μm or less are necessary with respect to design example (1) and design example (2) respectively.

It is seen from these results that in the 4-core optical fibers in design example (1) and design example (2), the minimum necessary cladding diameters are 116.2 μm and 124.0 μm respectively. It is seen in both design examples that four cores having a standard cladding diameter of 125 μm can be disposed.

EXAMPLES

Figure 18:
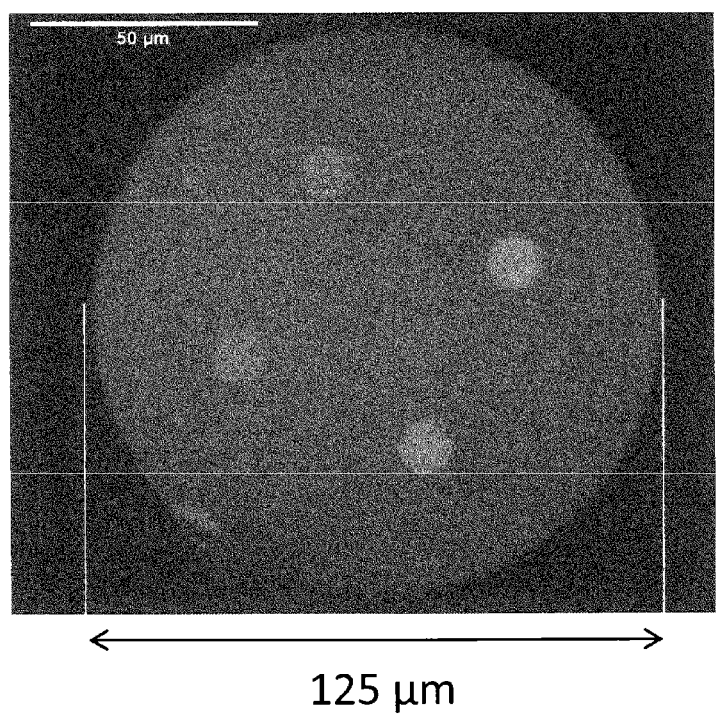
FIG. 18 is a cross-sectional view of the multicore optical fiber according to the present invention.

FIG. 18 is a cross-sectional photo of the multicore optical fiber according to the present example. FIG. 19 shows the measurement results.

It is seen from the cross-sectional photo in FIG. 18 that the multicore optical fiber has a cladding diameter of 125 μm and that four cores are disposed.

It can also be confirmed from FIG. 19 that in a refractive index distribution of each core, a core radius is 6 μm, a2/a1 is 3, Δ1 and A2 are −0.6% and −0.4% respectively, thus satisfying the formula expressing the aforementioned structural conditions.

Regarding the optical characteristics, $A_{eff}$ was 80 μm² or more and the cutoff wavelength was 1480 nm or less.

The transmission losses were 0.18 dB/km or less and 0.25 dB/km or less at wavelengths of 1550 nm and 1625 nm respectively and since no significant increase of loss was observed on the long wavelength side, it is considered that sufficient OCT is secured.

XT is −66 dB/km or less at a wavelength of 1625 nm and XT characteristics for transmission distances of over 10000 km were obtained in all communication wavelength bands.

(Design Method)

Figure 20:
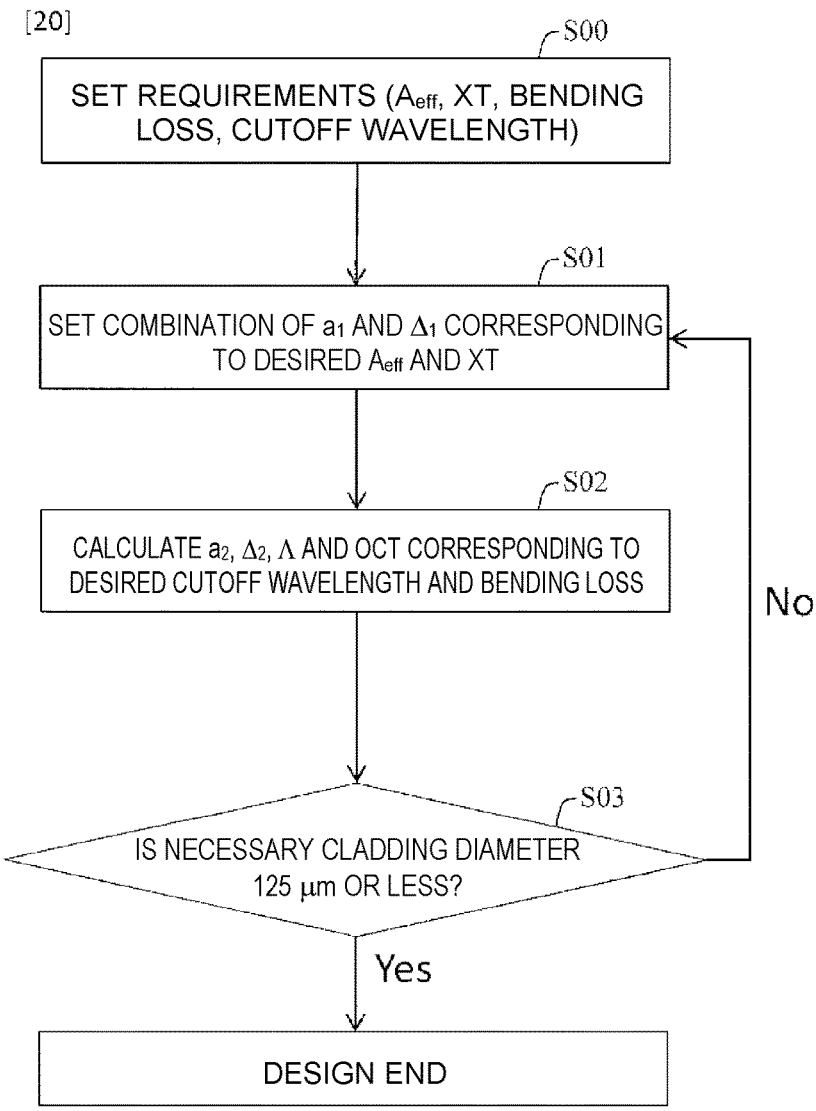
FIG. 20 is a flowchart describing a design method according to the present invention.

FIG. 20 is a flowchart describing a design method for a multicore optical fiber.

The multicore optical fiber includes:

four cores having a radius $a_1$, disposed in a longitudinal direction in square lattice shape;

a first cladding region disposed around the core and having a radius $a_2$ with a refractive index lower than the refractive index of the core, a specific relative refractive index difference between the cladding region and the core being $\Delta_1$; and a second cladding region disposed on an outer periphery of the first cladding region and having a refractive index higher than the refractive index of the first cladding region and lower than the refractive index of the core, a specific relative refractive index difference between the cladding region and the core being $\Delta_2$, in which the design method executes:

a first step S01 of selecting a combination of the $a_1$ and the $\Delta_1$ from requirements for effective cross-sectional area $A_{eff}$ (μm²) and a total value XT (dB/km) of inter-core crosstalk per km;

a second step S02 of selecting the $a_2$ and the $\Delta_2$ that satisfy requirements for a cutoff wavelength and bending loss in the combination selected in the first step S01 and acquiring a core interval relationship between the $\Delta_1$ with respect to the XT and a core interval Λ, and an OCT relationship between the $\Delta_1$ and a shortest distance OCT from the outer periphery of the second cladding region to a center of the core with respect to requirements for an excessive loss $\alpha_c$; and a third step S03 of calculating an outer diameter ϕ of the second cladding region at the $\Delta_1$ acquired in the first step using the core interval relationship and the OCT relationship acquired in the second step S02 according to:

$$\phi = 2 \times (\Lambda/\sqrt{2} + OCT)$$

and determining whether the outer diameter ϕ becomes 125 μm or less.

When a 4-core optical fiber having a standard cladding diameter of 125 μm is designed, requirements for the $A_{eff}$, the XT, the bending loss and the cutoff wavelength are set first (step S00).

Next, in step S01, a combination of $a_1$ and $\Delta_1$ that satisfies the requirements for $A_{eff}$ is selected as shown in FIG. 3 to FIG. 5. As shown in FIG. 10 and FIG. 11, a condition for $\Delta_1$ corresponding to the desired XT is set. For example, when $A_{eff}$ is 80 μm² or more, a combination of $a_1$ and $\Delta_1$ that satisfies Formula 1 and Formula 3 is selected in first step S01.

Next, in step S02, as shown, for example, in FIG. 6, FIG. 7 to FIG. 9, $a_2$ and $\Delta_2$ that satisfy the requirements for the bending loss and XT are selected for $a_1$ and $\Delta_1$ selected in advance. More specifically, $a_2$ is selected from the graph in FIG. 12 obtained from FIG. 7 to FIG. 9 and $\Delta_2$ is selected from the graphs in FIG. 13 and FIG. 14. At this time, parameters of the core 10 and the first cladding region 11 are obtained. For example, when $a_2/a_1$ is 3.0 or less, $\Delta_2$ that satisfies Formula 3 is selected in second step S02. Since all $a_1$, $a_2$, $\Delta_1$ and $\Delta_2$ are available at this time, using FIG. 6, the requirements for XT, and a core interval and an OCT that can sufficiently reduce the excessive loss are calculated and a necessary cladding diameter is calculated.

Finally, in step S03, if the necessary cladding diameter is 125±1 μm or less, the design is completed. If the cladding diameter is larger than 125±1 μm, parameters of the core and the first cladding region are re-selected so as to obtain 125±1 μm or less (repeat from step S01).

(Optical Transmission Method)

Figure 21:
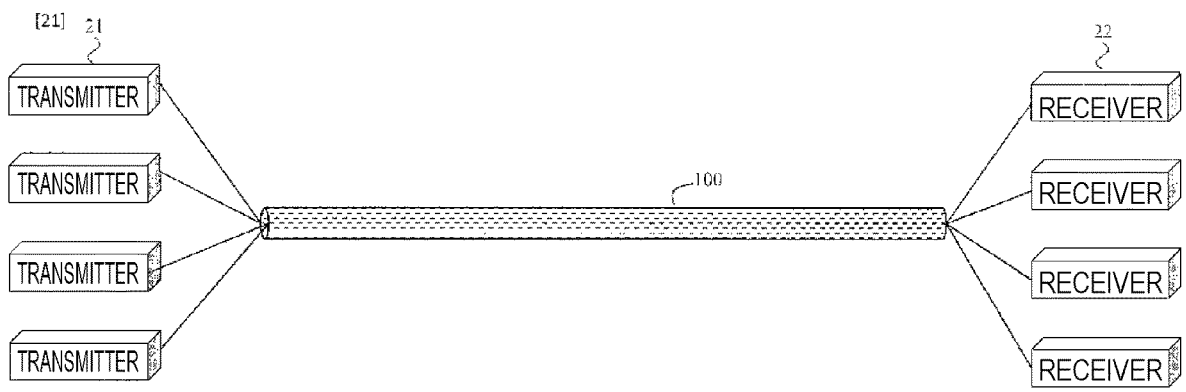
FIG. 21 is a diagram illustrating an optical transmission method according to the present invention.

FIG. 21 is a diagram illustrating an optical transmission method using the aforementioned multicore optical fiber. The optical transmission method according to the present invention is characterized in that the multicore optical fiber 15 of 1000 km or more is used as an optical transmission path, signal light having a wavelength of 1530 nm or more is transmitted from four transmitters 21 for each core 10 of the multicore optical fiber 15, and four receivers 22 receive the signal light for each core 10 of the multicore optical fiber 15.

The optical fiber cable 100 is provided with the 4-core optical fiber 15, the transmitter 21 and the receiver 22 are connected to the transmitting side and the receiving side of each core 10 respectively. As described above, the optical fiber cable 100 has a maximum crosstalk of −54 dB/km or less and is suitable for long-distance transmission of several thousands of kilometers. Here, it is assumed that cable installation includes connection points between fibers and light amplifiers, but crosstalk in the fibers becomes dominant in transmission paths of several thousands of kilometers and influences of crosstalk at other connection points or optical components are considered to be sufficiently small.

The present optical transmission method can replace the single mode optical fiber of the submarine communication system having a communication distance of 1000 km or more with the multicore optical fiber 15, transmit signal light having a wavelength of 1530 nm or more from the four transmitters 21 for each core 10 of the multicore optical fiber 15 and receive the signal light by the four receivers 22 from each core 10 of the multicore optical fiber 15.

Since the multicore optical fiber 15 adopting a standard cladding diameter is used for the optical fiber cable, the existing optical cable structure can be reused, which is preferable.

INDUSTRIAL APPLICABILITY

The present invention can be used for optical fibers in optical communication systems.

REFERENCE SIGNS LIST 10 core
11 first cladding region
12 second cladding region
21 transmitter
22 receiver
100 optical cable

The invention claimed is:

1. A multicore optical fiber comprising:
    four cores having a radius a1 disposed in a longitudinal direction in square lattice shape;
    first cladding regions disposed around each of the cores and having a radius a2 with a refractive index lower than a refractive index of the cores, a specific relative refractive index difference to the cores being $\Delta 1$; and
    a second cladding region disposed on an outer periphery of the first cladding regions and having a refractive index higher than the refractive index of the first cladding regions and lower than the refractive index of the cores, a specific relative refractive index difference to the core being $\Delta 2$, wherein
    an outer diameter of the second cladding region is 125±1 µm,
    an effective cross-sectional area at a wavelength of 1550 nm is 80 µm2 or more,
    bending loss at a wavelength of 1625 nm and a bending radius of 30 mm is 0.1 dB/100 turns or less, and
    a cutoff wavelength is 1530 nm or less.

2. The multicore optical fiber according to claim 1, further comprising a region having a width w and having a same refractive index as the refractive index of the second cladding region between each of the cores and the first cladding region.

3. The multicore optical fiber according to claim 2, wherein the width w is 0 µm<w≤1.3 µm.

4. The multicore optical fiber according to claim 1, wherein a relationship between the $\Delta 1$ and a total value XT (dB/km) of inter-core crosstalk per km satisfies Formula C1,

[Formula C1]

$$\Delta_1 \leq 4.93 \times 10^{-5} XT - 0.00127 \quad (C1).$$

5. The multicore optical fiber according to claim 1, wherein a relationship between the a1 and the $\Delta 1$ satisfies Formula C2,

[Formula C2]

$$\alpha_1 \geq -28041\Delta_1^2 - 560.65\Delta_1 + 3.1369 \quad (C2).$$

6. The multicore optical fiber according to claim 1, wherein a relationship between the $\Delta 2$ and a total value XT (dB/km) of inter-core crosstalk per km satisfies Formula C3,

[Formula C3]

$$\Delta_2 \geq -1.14 \times 10^{-5} XT - 0.00509 \quad (C3).$$

7. The multicore optical fiber according to claim 1, wherein
    a ratio a2/a1 between the a1 and the a2 is 1.0 or more and 3.0 or less,
    a relationship between the $\Delta 1$, the a2/a1, and an effective cross-sectional area Aeff at a wavelength of 1550 nm satisfies Formula C4 and
    a relationship between the $\Delta 2$, the a2/a1, and the Aeff satisfies Formula C5,

[Formula C4]

$$\Delta_1 \leq (1.9 \times 10^{-6} A_{\mathit{eff}}^2 - 0.00033 A_{\mathit{eff}} + 0.0163) a_2/a_1 + (-8.0 \times 10^{-6} A_{\mathit{eff}}^2 + 0.00139 A_{\mathit{eff}} - 0.0705) \quad (C4)$$

[Formula C5]

$$\Delta_2 \geq (5.0 \times 10^{-8} A_{\mathit{eff}}^2 - 6.5 \times 10^{-6} A_{\mathit{eff}} - 0.00108) a_2/a_1 + (-2.9 \times 10^{-7} A_{\mathit{eff}}^2 + 5.58 \times 10^{-5} A_{\mathit{eff}} - 0.00594)$$

and $$\Delta_2 \leq (5.0 \times 10^{-7} A_{\mathit{eff}}^2 - 9.5 \times 10^{-5} A_{\mathit{eff}} + 0.0056) a_2/a_1 + (-1.6 \times 10^{-6} A_{\mathit{eff}}^2 + 0.00031 A_{\mathit{eff}} - 0.0208) \quad (C5).$$

8. The multicore optical fiber according to claim 5, wherein the $\Delta 1$ and the $\Delta 2$ satisfy Formula C6,

[Formula C6]

$$-0.7\% \leq \Delta_1 \leq -0.49\%$$

$$-0.4\% \leq \Delta_2 \leq -0.27\% \quad (C6).$$

9. The multicore optical fiber according to claim 7, wherein the $\Delta 1$ and the $\Delta 2$ satisfy Formula C6,

[Formula C6]

$$-0.7\% \leq \Delta_1 \leq -0.49\%$$

$$-0.4\% \leq \Delta_2 \leq -0.27\% \quad (C6).$$

* * * * *